US008706068B2

(12) United States Patent  
Flordelis et al.

(10) Patent No.: US 8,706,068 B2  
(45) Date of Patent: Apr. 22, 2014

(54) ADAPTIVE SIGNAL POWER MEASUREMENT METHODS AND APPARATUS

(75) Inventors: Jose Flordelis, Lund (SE); Joakim Axmon, Kävlinge (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 831 days.

(21) Appl. No.: 12/421,104

(22) Filed: Apr. 9, 2009

(65) Prior Publication Data

US 2009/0318090 A1 Dec. 24, 2009

Related U.S. Application Data

(63) Continuation-in-part of application No. 12/143,975, filed on Jun. 23, 2008.

(51) Int. Cl.  
*H04B 17/00* (2006.01)

(52) U.S. Cl.  
USPC ........ 455/226.2; 455/574; 455/434; 455/515; 455/67.15; 455/161.3

(58) Field of Classification Search  
USPC ......... 455/226.2, 226.3, 5, 574, 226.1–226.4, 455/434, 515, 67.11, 67.15, 70, 455/179.1–187.1, 161.3  
See application file for complete search history.

(56) References Cited

U.S. PATENT DOCUMENTS

| 5,794,146 | A | * | 8/1998 | Sevcik et al. | ................. | 455/434 |
| 7,313,116 | B2 | | 12/2007 | Lee et al. | | |
| 2006/0072524 | A1 | | 4/2006 | Perahia et al. | | |
| 2006/0223557 | A1 | | 10/2006 | Manohar | | |
| 2007/0298780 | A1 | | 12/2007 | Lindoff et al. | | |
| 2008/0123570 | A1 | | 5/2008 | Yin | | |
| 2008/0189970 | A1 | | 8/2008 | Wang et al. | | |
| 2008/0274742 | A1 | | 11/2008 | Bi | | |
| 2008/0318577 | A1 | * | 12/2008 | Somasundaram et al. | .... | 455/436 |
| 2009/0042559 | A1 | * | 2/2009 | Choi | ............................ | 455/423 |
| 2009/0197555 | A1 | | 8/2009 | Lindoff et al. | | |
| 2010/0279638 | A1 | | 11/2010 | Lindoff | | |

FOREIGN PATENT DOCUMENTS

WO          02087106 A1 * 10/2002

OTHER PUBLICATIONS

Motorola, E-UTRAN Measurement Gap Control for Inter-Frequency and Inter-RAT Handover, Tdoc R2-072012, 2007-05-07, 3GPP.  
Nokia, UE RSRP Measurement Accuracy, Tdoc R4-070611, 2007-05-07, 3GPP.

(Continued)

*Primary Examiner* — Edward Urban  
*Assistant Examiner* — Rui Hu  
(74) *Attorney, Agent, or Firm* — Potomac Patent Group PLLC

(57) ABSTRACT

Methods and apparatus in a mobile receiver for selecting among methods of estimating a received power of at least one signal. A method includes selecting a first method or a second method of measuring the received power based on a cell timing and a measurement interval. Information is received from a first base station about the measurement interval during which to perform the first method and the second method on a signal transmitted by at least one second base station. The timing of the at least one second base station is determined, and based on the timing of the at least one second base station and the measurement interval, one of the first method and the second method is selected.

22 Claims, 5 Drawing Sheets

(56) References Cited

OTHER PUBLICATIONS

D. Perels et al., An Automatic Gain Controller for MIMO-OFDM WLAN Systems, 4th Euro Conf Circuits and Systems for Comms, 2008-07-10, pp. 246-251, IEEE.

3GPP, Technical Specification 36.331 V8.4.0, TSG Radio Access Network, Evolved Universal Terrestrial Radio Access (E-Utra) Radio Resource Control (RRC), Protocol Specification (Release 8), Dec. 1, 2008, pp. 1-198.

3GPP, Technical Specification 45.008 V8.2.0, TSG GSM/EDGE Radio Access Network, Radio Subsystem Link Control (Release 8), Feb. 1, 2009, pp. 1-137.

EPO, Intl Search Rpt in PCT/EP2010/054094, Jul. 20, 2010.

* cited by examiner

ADAPTIVE SIGNAL POWER MEASUREMENT METHODS AND APPARATUS

This application is a continuation in part of U.S. patent application Ser. No. 12/143,975 filed on Jun. 23, 2008, which is incorporated by reference in this application.

BACKGROUND

This invention relates to radio communication systems and more particularly to measurement of received signal power in such systems.

In the continuing evolution of mobile cellular radio standards like GSM and wideband code division multiple access (WCDMA), new transmission techniques like orthogonal frequency division multiplex (OFDM) will be used in new cellular communication systems. Furthermore, to migrate smoothly from existing cellular systems to new high-capacity, high-data-rate systems in the existing radio spectrum, the new systems have to be able to operate with flexible communication channel bandwidths.

One such new flexible cellular communication system is called Third Generation Long Term Evolution (3G LTE), which is currently being standardized by the Third Generation Partnership Project (3GPP). The 3G LTE specifications can be seen as an evolution of the current WCDMA specifications also promulgated by the 3GPP. A 3G LTE system will use OFDM as a multiple access technique (called OFDMA) in the downlink (DL) from system nodes to user equipments (UEs), will operate with channel bandwidths ranging from about 1.4 megahertz (MHz) to about 20 MHz, and will support data rates up to 100 megabits per second (Mb/s) on the largest-bandwidth channels. Besides high-data-rate services, 3G LTE systems are expected to provide low-data-rate services, such as speech. Because 3G LTE is designed for packet data according to the familiar transmission control protocol/internet protocol (TCP/IP), it is expected that the service that carries speech will use voice-over-IP (VoIP).

In an OFDMA communication system, the data stream to be transmitted is portioned among a number of narrowband subcarriers that are transmitted in parallel. In general, a resource block devoted to a particular UE is a particular number of particular subcarriers used for a particular period of time. Different groups of subcarriers can be used at different times for different users. Because each subcarrier is narrowband, each carrier experiences mainly flat fading, which makes it easier for a UE to demodulate each subcarrier. OFDMA communication systems are described in the literature, for example, U.S. Patent Application Publication No. US 2008/0031368 A1 by B. Lindoff et al.

FIG. 1 depicts a typical cellular communication system 10. Radio network controllers (RNCs) 12, 14 control various radio network functions, including for example radio access bearer setup, diversity handover, etc. In general, each RNC directs calls to and from a UE, such as a mobile station (MS), mobile phone, or other remote terminal, via appropriate base station(s) (BSs), which communicate with each other through DL (or forward) and uplink (UL, or reverse) channels. In FIG. 1, RNC 12 is shown coupled to BSs 16, 18, 20, and RNC 14 is shown coupled to BSs 22, 24, 26.

Each BS, or Node B in 3G vocabulary, serves a geographical area that is divided into one or more cell(s). In FIG. 1, BS 26 is shown as having five antenna sectors S1-S5, which can be said to make up the cell of the BS 26, although a sector or other area served by signals from a BS can also be called a cell. In addition, a BS may use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It should be understood that the arrangement of functionalities depicted in FIG. 1 can be modified in 3G LTE and other communication systems. For example, the functionality of the RNCs 12, 14 can be moved to the Node Bs 22, 24, 26, and other functionalities can be moved to other nodes in the network. It will also be understood that a base station can use multiple transmit antennas to transmit information into a cell/sector/area, and those different transmit antennas can send respective, different pilot signals.

FIG. 2 is a frequency-vs.-time plot showing an arrangement of DL subcarriers in an OFDM communication system, such as a 3G LTE system. As shown in FIG. 2, a resource block includes twelve subcarriers spaced apart by fifteen kilohertz (kHz), which together occupy 180 kHz in frequency and 0.5 millisecond (ms) in time, or one time slot. FIG. 2 shows each time slot including seven OFDM symbols, or resource elements (REs), each of which has a short (normal) cyclic prefix, although six OFDM symbols having long (extended) cyclic prefixes can also be used in a time slot. It will be understood that resource blocks can include various numbers of subcarriers for various periods of time.

An important aspect of a 3G LTE system is the mobility of the UEs, and so fast and efficient cell search and received signal power measurements are important for a UE to get and stay connected to a suitable cell, which can be called the "serving cell", and to be handed over from one serving cell to another. Furthermore, operators will deploy LTE gradually in time and location, and so Inter-Radio Access Technology (IRAT) mobility will be an important functionality. Mobility from a GSM/WCDMA system to an LTE system is just one of many examples of IRAT mobility.

In current 3G LTE specifications, handover decisions are based on measurements of reference signal received power (RSRP), which can be defined as the average received signal power of reference signals or symbols (RS) transmitted by a Node B. A UE measures RSRP on its serving cell as well as on neighboring cells that the UE has detected as a result of a specified cell search procedure.

The RS, or pilots, are transmitted from each Node B at known frequencies and time instants, and are used by UEs for synchronization and other purposes besides handover. Such reference signals and symbols are described for example in Sections 6.10 and 6.11 of 3GPP Technical Specification (TS) 36.211 V8.4.0, Physical Channels and Modulation (Release 8), September 2008.

RS are transmitted from each of possibly 1, 2, or 4 transmit antennas of a Node B on particular REs that can be conveniently represented on the frequency-vs.-time plane as depicted in FIG. 3. It will be understood that the arrangement of FIG. 3 is just an example and that other arrangements can be used.

FIG. 3 shows two successive time slots, indicated by the vertical solid lines, which can be called a sub-frame. FIG. 3 also shows two resource blocks, which are indicated by the dashed lines. The frequency range depicted in FIG. 3 includes about twenty-six subcarriers, only nine of which are explicitly indicated. RS transmitted by a first transmit (TX) antenna of a Node B are denoted R and by a possible second TX antenna in the node are denoted by S. In FIG. 3, RS are depicted as transmitted on every sixth subcarrier in OFDM symbol 0 and OFDM symbol 3 or 4 (depending on whether the symbols have long or short cyclic prefixes) in every slot. Also in FIG. 3, the RSs in symbols 3 or 4 are offset by 3 subcarriers relative to the RS in OFDM symbol 0, the first OFDM symbol in a slot.

The artisan will understand that it is desirable for a UE to base its RSRP measurements in optimal ways on RS transmitted in the serving or other cell. A cell detected in a cell search procedure but not currently connected to the UE can be called "a detected neighboring cell". Low signal-to-interference ratio (SIR) is a common situation for a detected neighboring cell because such a cell's signal power level at the UE is usually lower than the received power level of the serving cell. Different SIRs can call for different RSRP measurement methods.

Furthermore, a UE typically assumes that the characteristics of the DL channel are constant over a number of subcarriers (i.e., the channel is constant with frequency) and over a number of OFDM symbols (i.e., the channel is constant in time). Based on that assumption, the UE estimates the RSRP by coherently averaging received symbols over such a "constant" group to get a channel estimate $H_i$ for a subcarrier i, computes the square of the absolute value of the channel estimate $|H_i|^2$ to obtain a received signal power estimate over the "constant" group of symbols, and then computes a non-coherent average of such signal power estimates over several groups, e.g., an entire channel bandwidth, to determine an RSRP measurement (estimate). Two such assumed "constant" groups are indicated in FIG. 3 by the dashed lines.

In the arrangement depicted in FIG. 3, such a "simple" cell measurement method of coherent averaging followed by non-coherent averaging to estimate the RSRP can proceed as follows. The UE's baseband signal $Y_i$ corresponding to an RS $R_i$ from TX antenna 1 can be written as follows:

$$Y_i^1 = H_i^1 R_i + E_i \quad \text{Eq. 1}$$

and the UE's baseband signal corresponding to an RS $S_i$ from a possible TX antenna 2 can be written similarly as follows:

$$Y_i^2 = H_i^2 S_i + E_i \quad \text{Eq. 2}$$

from which the impulse response $H_i$ of the channel can be estimated using the known RS symbols $R_i$, $S_i$. It will be noted that the superscript 2 in Eq. 2 does not denote a square but a second TX antenna.

Coherent averaging of a number M of received reference symbols followed by non-coherent averaging of a number N of coherent averages (i.e., non-coherent averaging over N resource blocks) can be written as follows:

$$S^{est} = \frac{1}{N} \sum_{n=1}^{N} \left| \frac{1}{M} \sum_{m=1}^{M} RS_m^{est} \right|_n^2 \quad \text{Eq. 3}$$

in which $S^{est}$ is the RSRP measurement (estimate) and $RS^{est}$ are channel response estimates based on the RS symbols $R_i$ or $S_i$. The non-coherent averaging is typically done over an entire UE measurement bandwidth (e.g., 1.4 MHz, or six pairs of resource blocks) to determine the total RSRP estimate.

Besides having a variable SIR, the DL channel commonly suffers from delay spread and Doppler shift, and so the channel is not constant as typically assumed, leading to increased probability of erroneous RSRP measurement values. A known solution to this problem of varying DL channels is to use more advanced methods of estimating the channel and signal power (e.g., methods based on Wiener filtering). Such more advanced methods are computationally intensive, consuming time, power, and/or hardware resources that are limited in many UEs, increase the complexity of the signal-power-estimate processing in a UE, and need to be done on each detected neighboring cell, all of which render this solution undesirable.

Inter-frequency cell measurements are typically done in inter-frequency measurement gaps, which is to say that the UE is configured to halt its reception of information from its serving cell in order to switch its received carrier frequency and do measurements on inter-frequency or IRAT cells. Depending, for example, on the relative timing of the inter-frequency gaps and the cells, a UE can either use the above-described "simple" method to do received signal measurements or it can not.

FIG. 4 depicts an example of inter-frequency cell measurements for the case of GSM cells (indicated by (A) and (B)) and an LTE cell that uses time-division duplex (TDD). Time is arranged along the horizontal direction in FIG. 4, and the succession of resource blocks of the LTE TDD cell is indicated in the middle of FIG. 4. The succession of GSM frames is indicated for two offset timings, with the radio set-up periods at the beginnings and ends of frames being indicated by the hatched areas. For GSM cells, the inter-frequency measurement gap available for IRAT cell measurements is only around 5.2 ms, which is the duration of the idle frame that occurs every twenty-six frames. For a LTE TDD cell, only a subset of the sub-frames can be used for RSRP measurements. The above-described "simple" method can thus be used only for some relative timings of the inter-frequency cells. The relative timing of GSM cell (A) shown in FIG. 4 is such that it allows the above-described "simple" measurement method to be used because all of the LTE resource blocks occur in the idle frame, during which the UE can re-tune its receiver to do cell measurements on the LTE cell. In contrast, the UE cannot use the above-described "simple" measurement method when a relative timing such as cell (B) exists.

Previous solutions to this problem always require more complicated channel and signal power estimate methods (for instance, methods based on Wiener filtering) in order to cope with such "worst case" scenarios in which the above-described "simple" measurement method cannot be used. As mentioned above, such more complicated methods are undesirable.

Therefore, there is a need for improved methods and apparatus for inter-frequency and IRAT cell measurements without significantly increasing the complexity of the measurements.

SUMMARY

In one aspect of this invention, there is provided, in a mobile receiver in a communication system, a method of selecting one of a plurality of methods of measuring a received power of at least one signal of at least one base station. The method of selecting includes receiving information from a first base station about a measurement interval during which to perform a first measuring method or a second measuring method on a signal of at least one second base station; determining a timing of the signal of the at least one second base station; and based on the timing of the signal of the at least one second base station and the measurement interval, selecting one of the first measuring method and the second measuring method.

In another aspect of this invention, there is provided, in a mobile receiver in a communication system, an apparatus for selecting one of a plurality of methods of measuring a received power of at least one signal of at least one base station. The apparatus includes a receiver configured for information carried by a signal from a first base station about a measurement interval during which to perform a first measuring method or a second measuring method on a signal of at least one second base station; and a processor configured to determine a timing of the signal of the at least one second base station and to select, based on the timing of the signal of the at least one second base station and the measurement interval, one of the first measuring method and the second measuring method.

In another aspect of this invention, there is provided a computer-readable medium containing instructions that, when executed by the computer, cause the computer to carry out a method in a mobile receiver in a communication system of selecting one of a plurality of methods of measuring a received power of at least one signal of at least one base station. The method includes receiving information from a first base station about a measurement interval during which to perform a first measuring method or a second measuring method on a signal of at least one second base station; determining a timing of the signal of the at least one second base station; and based on the timing of the signal of the at least one second base station and the measurement interval, selecting one of the first measuring method and the second measuring method.

BRIEF DESCRIPTION OF THE DRAWINGS

The several features, objects, and advantages of this invention will be understood by reading this description in conjunction with the drawings, in which.

DETAILED DESCRIPTION

The methods and apparatus for measuring received signal power for handover measurements (e.g., RSRP and similar measurements) in 3G LTE and similar communication systems are adapted based on either or both of the estimated (measured) signal power level and the relative timing between the measurement interval and the cell timing such that computationally intensive channel and signal-power estimation methods are used only when necessary. Adaptation based on estimated signal power level is described in detail in U.S. patent application Ser. No. 12/143,975 cited and incorporated above.

As described in more detail below, a UE can also or instead adapt its power measurement method based on the cell timing and the measurement interval. The UE, before doing such measurements, has detected the cell timing as a result of a cell search procedure, which also gives the cell identity. Thus, a UE's change of measurement method can be based on the time of occurrence of the measurement, which is a parameter that can be decided by the communication system and transmitted to the UE. In this way, a good trade-off between signal power measurement complexity and signal power measurement performance can be achieved.

Figure 4:
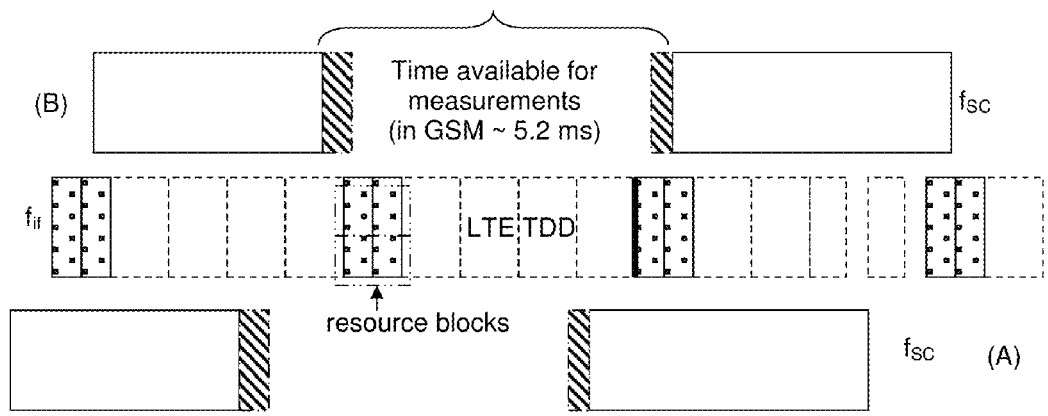
FIG. 4 depicts inter-frequency cell measurements.

For example, when the cell timing is "good", e.g., as depicted by (A) in FIG. 4, a simple measurement method can be used, e.g., a method of channel estimation or RSRP measurement based on simple averaging according to Eq. 3 above. When the cell timing is "bad", e.g., as depicted by (B) in FIG. 4, a more complicated measurement method can be used.

Figure 1:
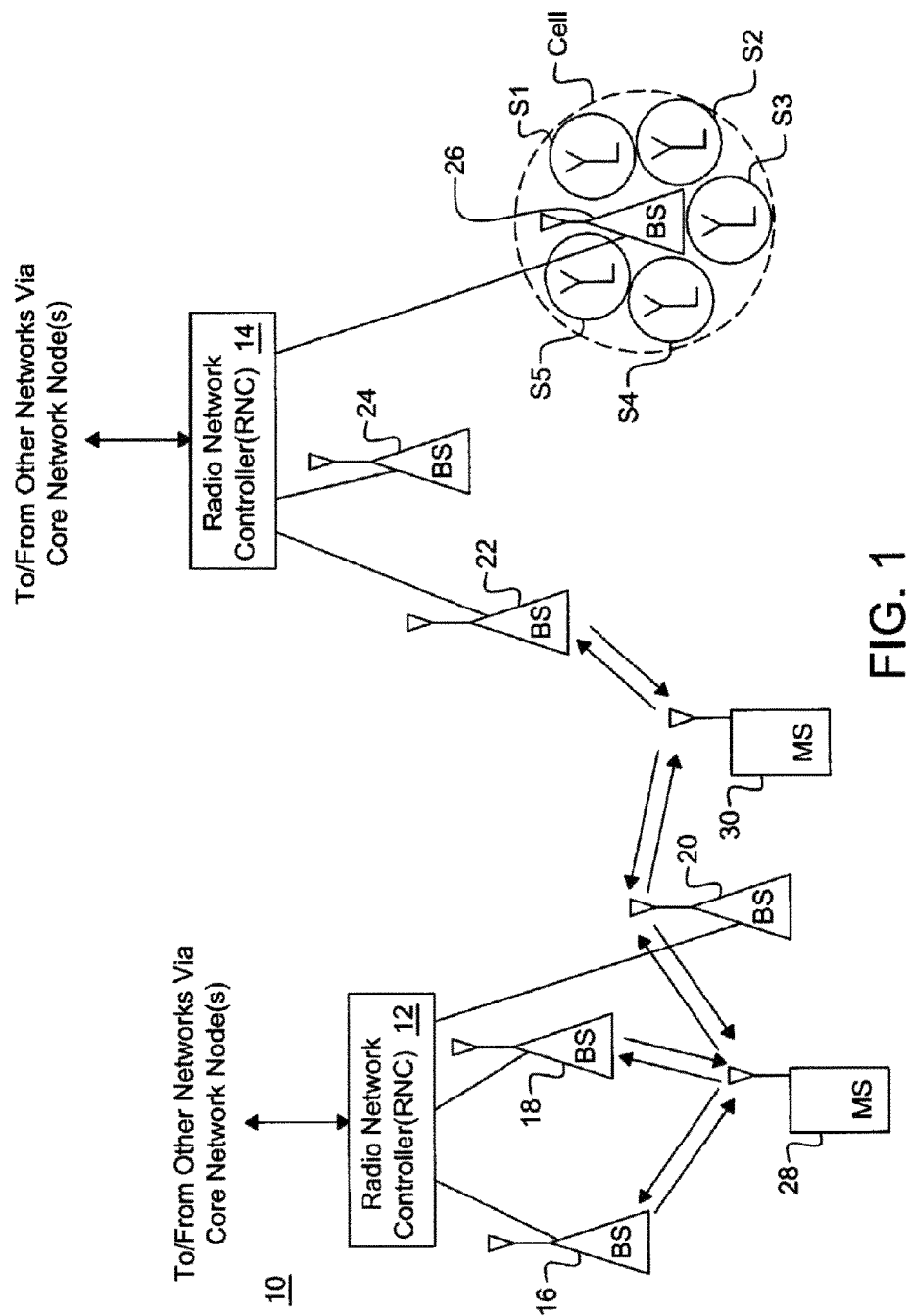
FIG. 1 depicts a cellular communication system.
Figure 2:
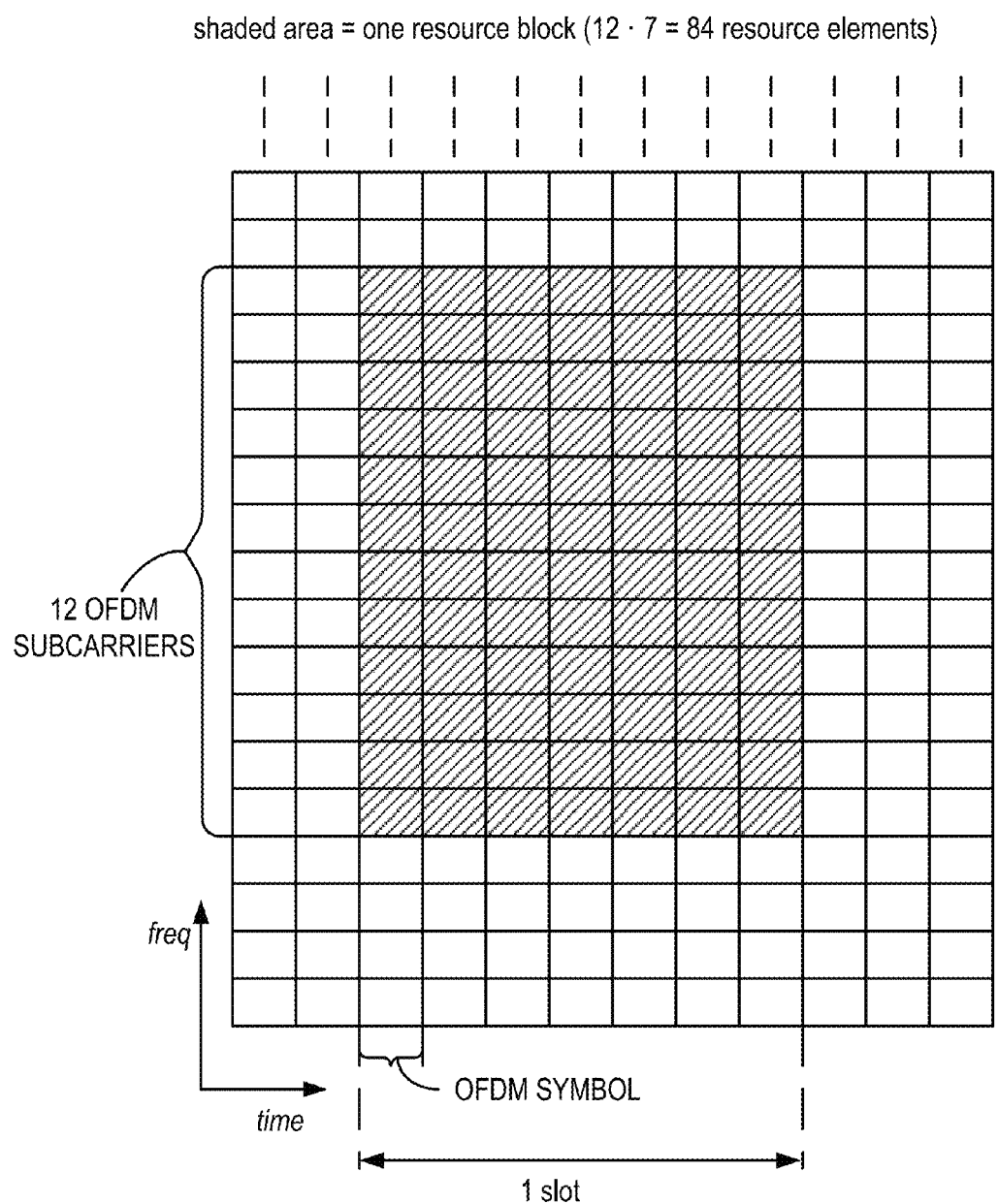
FIG. 2 depicts subcarriers and time intervals in a communication system that uses orthogonal frequency division multiple access.
Figure 3:
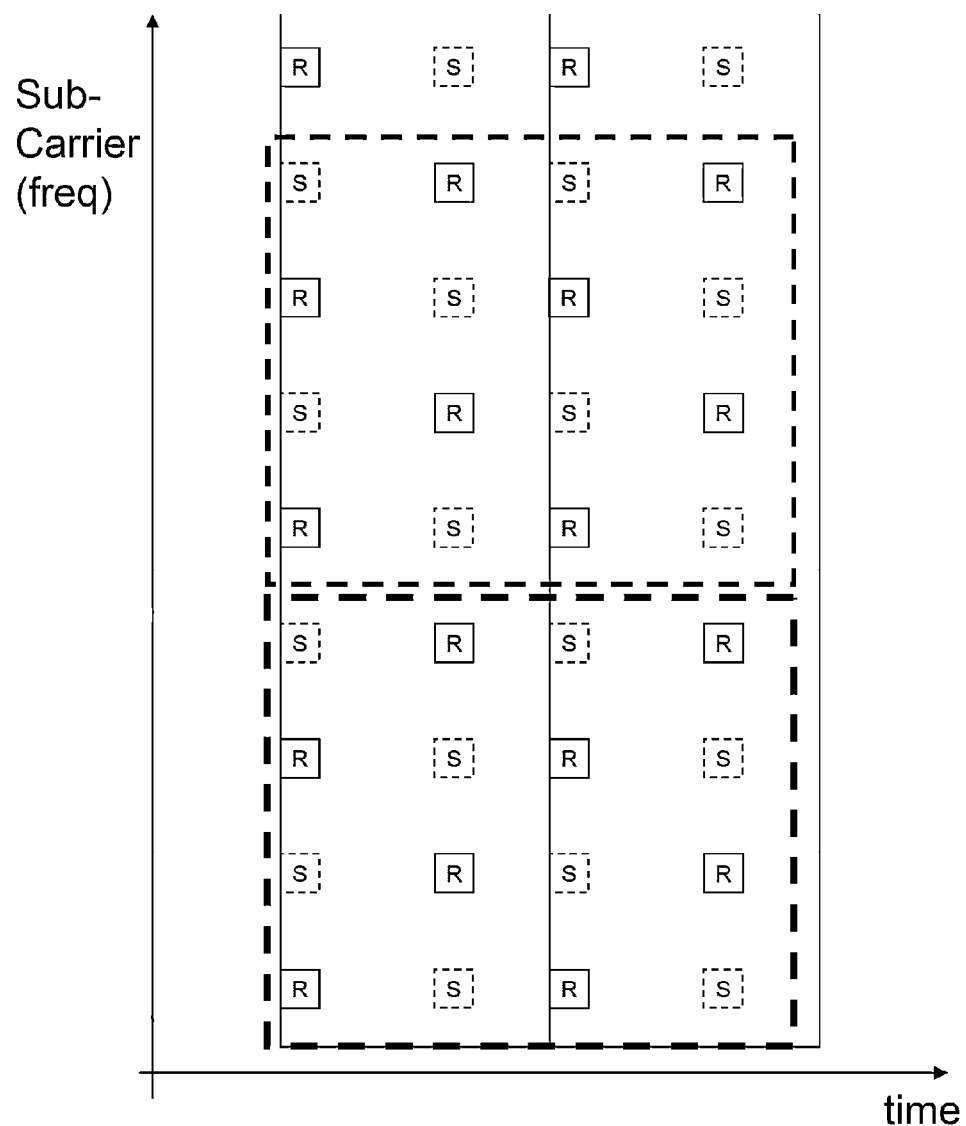
FIG. 3 depicts reference signals in a communication system that uses orthogonal frequency division multiple access.

Such a more complicated measurement method can include channel estimation based on one or more estimated channel characteristics, such as Doppler shift and delay spread, that can be expressed as follows:

$$S^{est} = \frac{1}{MN}\sum_{m,n} S^{est}_{m,n} = \frac{1}{MN}\sum_{m,n}\left|\sum_{l,k} a_{l-m,k-n} RS^{est}_{l-m,k-n}\right|^2 \qquad \text{Eq. 4}$$

in which the $a_{m,n}$ are suitable coefficients that depend on Doppler shift, delay spread, or other subcarrier channel characteristic; l and k are time and frequency indices, respectively; and m and n are indices of time and frequency positions of the channel response estimates $RS^{est}$ based on received reference symbols RS at totals of M and N time and frequency positions as depicted in FIG. 3.

According to Eq. 4, a received signal estimate $S_{m,n}^{est}$ is generated for each received reference symbol $RS_{m,n}$, and each such received signal estimate is generated by linear filtering of the neighboring RSs with filter coefficients $a_{l-m,k-n}$ that are a function of Doppler shift, delay spread, etc. As an example, the greater the Doppler shift, the faster |a| decays as |l−m| increases, and the greater the delay spread, the faster |a| decays as |k−n| increases.

Figure 5:
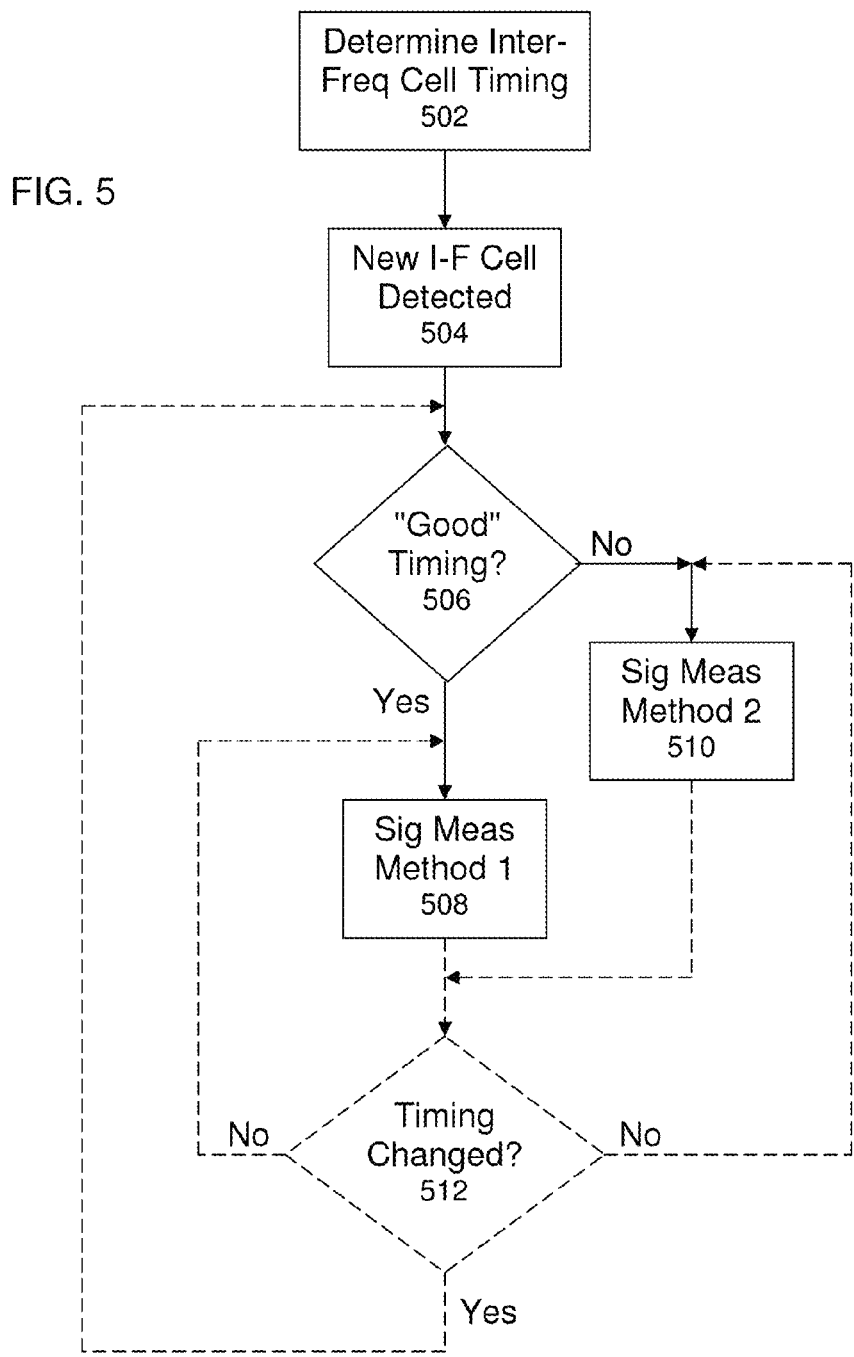
FIG. 5 is a flow chart of an improved measurement method.

FIG. 5 is a flow chart of an example of an improved measurement method based on the time of occurrence of a cell measurement. In this example, the UE is assumed to be operating in connected mode and using a service (e.g., data reception/transmission) with a serving GSM cell and to have determined that a more suitable RAT (in this example, an LTE cell) for the current service is available. It will be appreciated, however, that this invention can be implemented in other communication systems. From time to time, the UE carries out a specified cell search procedure, e.g., for determining neighboring cells to be used as potential handover candidates and for other purposes.

Information about the existence of a possibly more suitable RAT can be provided by the UE's serving cell in a suitable radio resource control (RRC), or Layer 3, message, such as those described in, for example, Section 6.3.1 of 3GPP TS 36.331 V8.4.0, E-UTRA Radio Resource Control (RRC), Protocol Specification (Release 8) (December 2008). Lists of LTE, WCDMA, and GSM neighboring cells for IRAT mobility can be included in the information elements of SystemInformationBlock (SIB) Types 5, 6, and 7, respectively, and information elements of other SIB Types can include lists of other cells, e.g., CDMA2000, etc.

Using such information, the UE can decide to make IRAT measurements, but typically the network orders the UE to make inter-frequency and IRAT measurements. In either case, the UE uses the information about neighboring cells in determining whether a more suitable RAT for the current service is available based on any of several factors. For example, the UE can compare the received signal quality (e.g., SIR) to a threshold or the UE can determine that more bandwidth is needed for the current service.

The network, e.g., the serving cell, can ask the UE to change RAT, for example, by sending a MobilityFromEUTRACommand message that is described in Section 5.4.3 of 3GPP TS 36.331. In preparation for such a re-selection or handover, the network can also ask the UE to measure the received signal quality of a destination cell before the network decides whether to have the UE change RAT. Measurements and messaging for such operations are described in, for example, Section 5.5 of 3GPP TS 36.331.

If a cell using a more suitable RAT is possibly available, the UE determines the inter-frequency cell timing (step 502). That determination can include the UE's reception from the system (e.g., the cell to which the UE is connected) of information about measurement gaps available for doing inter-frequency cell measurements. Such information can be sent from the serving cell to the UE in one or more suitable RRC messages. In some cases, the system need not send such messages because the UE can determine the gaps itself; in the example of a UE connected to a GSM cell, the UE already "knows" that an idle frame occurs every twenty-six frames because such gaps are required by the system specification. In other cases, such as WCDMA and LTE cells, the UE needs to receive an RRC message.

The UE searches for an inter-frequency cell (in this example, an LTE cell) according to a standard cell search procedure, and upon detecting an inter-frequency cell (step 504), the UE has determined that cell's timing. Depending on the timing (step 504), the UE uses different methods of cell measurement. In the case of "good" timing, e.g., as depicted by (A) in FIG. 4 (Yes in step 506), the UE can use the "simple" RSRP measurement method for cell measurements in succeeding measurement gaps (step 508). In the case of "bad" timing, e.g., as depicted by (B) in FIG. 4 (No in step 506), the UE can use a more complex RSRP measurement method in forthcoming measurement gaps (step 510).

It is advantageous if the UE continuously tracks the timing of the inter-frequency cell(s) (step 512). If the cell timing or measurement gap timing changes (Yes in step 512), the UE updates its choice of measurement method based on the new relative timing difference between the measurement gap and the cell timing. In other words, the process flow returns to step 506. If the cell timing or measurement gap timing does not change (No in step 512), the UE continues with its previous choice of measurement method. It will be appreciated that the cell timing can change primarily as a result of changes of UE position, and that the measurement gap timing can change as a result of RRC signaling information transmitted by the system. The tracking steps can be considered optional, and so they are indicated by dashed lines in FIG. 5.

The artisan will understand that the flow chart in FIG. 5 assumes only one detected new cell, but in general a UE can have a number of simultaneous detected neighboring cells for which RSRP measurements are made simultaneously or sequentially. Use of the first or second measurement methods can be chosen independently for each such cell, or use of the first or second measurement methods can be chosen based on whether the first or second methods has already been chosen for a selectable number of other detected neighboring cells. The selectable number can correspond to the processing load borne by the UE. Furthermore, the methods depicted in FIG. 5 can be applied to measurements on the serving cell.

Figure 6:
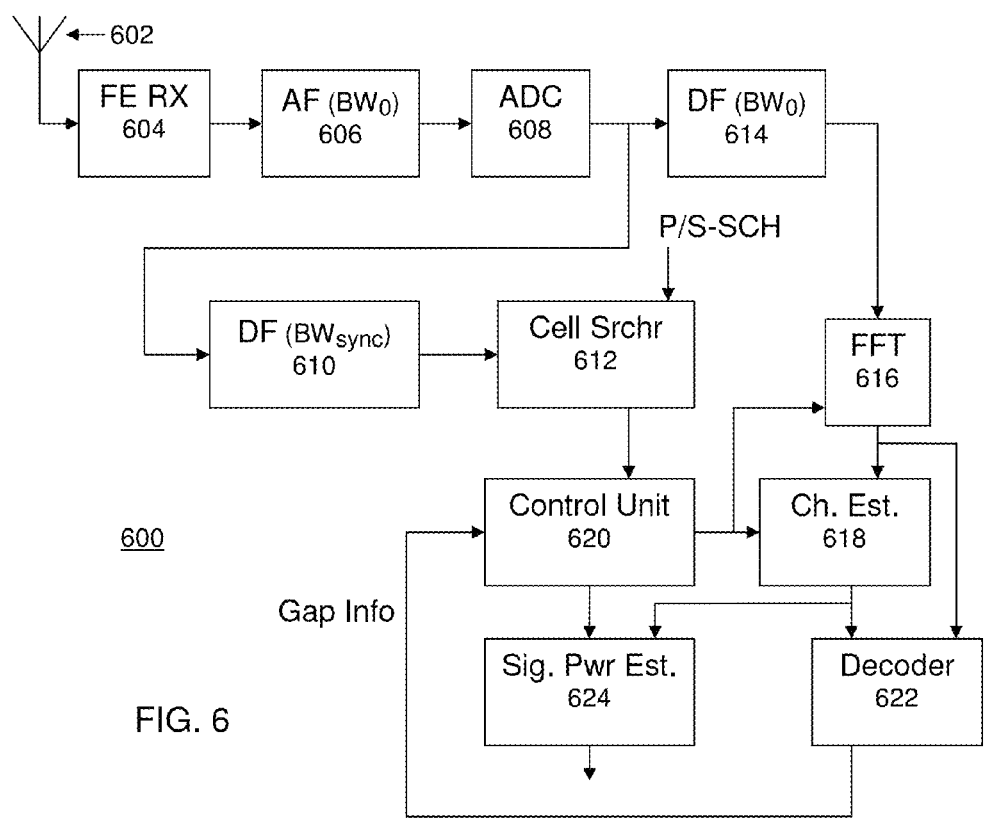
FIG. 6 is a block diagram of a portion of a receiver.

FIG. 6 is a block diagram of an arrangement 600 in a UE that can implement the methods described above. It will be appreciated that the functional blocks depicted in FIG. 6 can be combined and re-arranged in a variety of equivalent ways, and that many of the functions can be performed by one or more suitably programmed digital signal processors. Moreover, connections among and information provided or exchanged by the functional blocks depicted in FIG. 6 can be altered in various ways to enable a UE to implement other methods involved in the operation of the UE.

As depicted in FIG. 6, a UE receives a DL radio signal through an antenna 602 and typically down-converts the received radio signal to an analog baseband signal in a front end receiver (Fe RX) 604. The baseband signal is spectrally shaped by an analog filter 606 that has a bandwidth $BW_0$, and the shaped baseband signal generated by the filter 606 is converted from analog to digital form by an analog-to-digital converter (ADC) 608.

The digitized baseband signal is further spectrally shaped by a digital filter 610 that has a bandwidth $BW_{sync}$, which corresponds to the bandwidth of synchronization signals or symbols included in the DL signal. The shaped signal generated by the filter 610 is provided to a cell search unit 612 that carries out one or more methods of searching for cells as specified for the particular communication system, e.g., 3G LTE. Typically, such methods involve detecting predetermined primary and/or secondary synchronization channel (P/S-SCH) signals in the received signal.

The digitized baseband signal is also provided by the ADC 608 to a digital filter 614 that has the bandwidth $BW_0$, and the filtered digital baseband signal is provided to a processor 616 that implements a fast Fourier transform (FFT) or other suitable algorithm that generates a frequency-domain (spectral) representation of the baseband signal. A channel estimation unit 618 receives signals from the processor 616 and generates a channel estimate $H_{i,j}$ for each of several subcarriers i and cells j. For example, the unit 618 can generate the channel estimates according to either the first or the second estimation method as described above based on control and timing signals provided by a control unit 620, which also provides such control and timing information to the processor 616.

As described above, the estimator 618 provides the channel estimates $H_i$ to a decoder 622 and a signal power estimation unit 624. The decoder 622, which also receives signals from the processor 616, is suitably configured to extract measurement-gap and other information from RRC messages as described above and typically generates signals subject to further processing in the UE (not shown). The estimator 624 generates received signal power measurements (e.g., estimates of RSRP, received subcarrier power $S_i$, SIR, etc.). The estimator 624 can generate estimates of RSRP, reference signal received quality (RSRQ), received signal strength (RSSI), received subcarrier power $S_i$, SIR, etc., in various ways, for example, based on Eq. 3 or on Eq. 4 above and the cell timing, in response to control signals provided by the control unit 620. Power estimates generated by the estimator 624 are typically used in further signal processing in the UE.

In the arrangement depicted in FIG. 6, the control unit 620 keeps track of substantially everything needed to configure the processor 616 and estimation unit 618. For the latter, this includes both method and cell identity (for RS extraction and cell-specific scrambling of RS). Communication between the searcher 612 and the control unit 620 includes cell identity and, for example, cyclic prefix configuration.

Based on the cell timing and/or received signal power estimates, the control unit 620 determines which of the simple and more complicated estimation methods described above is used by the estimator 618 and/or by the estimator 624 for measurements on the detected cell(s). In particular, the determinations by the control unit 620 can, as described above, be based on gap information and timing.

In addition, the control unit 620 can track the timing of the inter-frequency cell(s) by implementing any of many suitable tracking algorithms. For example, the tracking algorithm can be based on matched filtering around the last known timing of the cell, with a filter corresponding to each particular cell's unique time-domain representation of S-SCH. In a simple system, the algorithm can include determining the largest peak in the filter output, but the artisan will understand that the filter output can be subjected to further analyses. Additional filtering can also be provided to reduce the noise in the timing estimates.

It will be appreciated that procedures described above are carried out repetitively as necessary, for example, to respond to the time-varying nature of communication channels between transmitters and receivers. In addition, in terms of the downlink and a UE, it will be understood that the methods and apparatus described here can be implemented in a BS or other uplink receiving node.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless receivers implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method in a mobile receiver in a communication system of selecting one of a plurality of methods of measuring a received power of at least one signal of at least one base station, the method of selecting comprising:

receiving information from a first base station about a measurement interval during which to perform a first measuring method or a second measuring method on a signal of at least one second base station;

determining a timing of the signal of the at least one second base station; and based on the timing of the signal of the at least one second base station and the measurement interval, selecting one of the first measuring method and the second measuring method;

wherein the first measuring method is selected when the timing of the signal of the at least one second base station is within the measurement interval, and the second measuring method is selected when the timing of the signal of the at least one second base station is not entirely within the measurement interval.

2. The method of claim 1, wherein the information is inter-frequency measurement gap information.

3. The method of claim 1, wherein the timing of the signal of the at least one second base station is determined based on synchronization signals transmitted by the at least one second base station.

4. The method of claim 1, wherein the first base station is a GSM base station and the at least one second base station is a Long Term Evolution base station.

5. The method of claim 4, wherein the first and second measuring methods measure at least one of reference signal received power, reference signal received quality, and received signal strength; the first measuring method is based on simple averaging of the at least one of reference received power, reference signal received quality, and received signal strength; and the second measuring method is based on estimated characteristics of a communication channel between the mobile receiver and the second base station.

6. The method of claim 1, wherein the second measuring method includes estimating at least one channel characteristic expressed as follows:

$$S^{est} = \frac{1}{MN} \sum_{m,n} \left| \sum_{l,k} a_{l-m,k-n} RS^{est}_{l-m,k-n} \right|^2$$

in which $S^{est}$ represents a received signal power estimate, $RS^{est}$ represents a channel response estimate based on a received reference symbol, a is a coefficient that depends on the at least one channel characteristic, l and k are time and frequency indices; and m and n are indices of time and frequency positions of received reference symbols RS at totals of M and N time and frequency positions.

7. The method of claim 1, wherein the first measuring method includes coherent averaging of a number M of received reference symbols followed by non-coherent averaging of N coherent averages.

8. The method of claim 1, further comprising tracking changes in at least one of the measurement interval and the timing of the at least one second base station.

9. An apparatus in a mobile receiver in a communication system for selecting one of a plurality of methods of measuring a received power of at least one signal of at least one base station, comprising:
a receiver configured for information carried by a signal from a first base station about a measurement interval during which to perform a first measuring method or a second measuring method on a signal of at least one second base station; and
a processor configured to determine a timing of the signal of the at least one second base station and to select, based on the timing of the signal of the at least one second base station and the measurement interval, one of the first measuring method and the second measuring method; wherein the first measuring method is selected when the timing of the signal of the at least one second base station is within the measurement interval, and the second measuring method is selected when the timing of the signal of the at least one second base station is not entirely within the measurement interval.

10. The apparatus of claim 9, wherein the information from the first base station is inter-frequency measurement gap information.

11. The apparatus of claim 9, wherein the processor determines the timing of the signal of the at least one second base station based on synchronization signals transmitted by the at least one second base station.

12. The apparatus of claim 9, wherein the first base station is a GSM base station and the at least one second base station is a Long Term Evolution base station; the first measuring method is based on simple averaging of the at least one of reference received power, reference signal received quality, and received signal strength; and the second measuring method is based on estimated characteristics of a communication channel between the mobile receiver and the second base station.

13. The apparatus of claim 12, wherein the first and second measuring methods measure at least one of reference signal received power, reference signal received quality, and received signal strength.

14. The apparatus of claim 9, wherein the second measuring method includes estimating at least one channel characteristic expressed as follows:

$$S^{est} = \frac{1}{MN} \sum_{m,n} \left| \sum_{l,k} a_{l-m,k-n} RS^{est}_{l-m,k-n} \right|^2$$

in which $S^{est}$ represents a received signal power estimate, $RS^{est}$ represents a channel response estimate based on a received reference symbol, a is a coefficient that depends on the at least one channel characteristic, l and k are time and frequency indices; and m and n are indices of time and frequency positions of received reference symbols RS at totals of M and N time and frequency positions.

15. The apparatus of claim 9, wherein the first measuring method includes coherent averaging of a number M of received reference symbols followed by non-coherent averaging of N coherent averages.

16. The apparatus of claim 9, wherein the processor tracks changes in at least one of the measurement interval and the timing of the at least one second base station.

17. A non-transitory computer-readable medium containing instructions that, when executed by the computer, cause the computer to carry out a method in a mobile receiver in a communication system of selecting one of a plurality of methods of measuring a received power of at least one signal of at least one base station, wherein the method of selecting comprises:
receiving information from a first base station about a measurement interval during which to perform a first measuring method or a second measuring method on a signal of at least one second base station;
determining a timing of the signal of the at least one second base station; and
based on the timing of the signal of the at least one second base station and the measurement interval, selecting one of the first measuring method and the second measuring method;
wherein the first measuring method is selected when the timing of the signal of the at least one second base station is within the measurement interval, and the second measuring method is selected when the timing of the signal of the at least one second base station is not entirely within the measurement interval.

18. The non-transitory medium of claim 17, wherein the information is inter-frequency measurement gap information.

19. The non-transitory medium of claim 17, wherein the timing of the signal of the at least one second base station is determined based on synchronization signals transmitted by the at least one second base station.

20. The non-transitory medium of claim 17, wherein the first measuring method is based on simple averaging of the at least one of reference received power, reference signal received quality, and received signal strength; and the second measuring method includes estimating at least one channel characteristic expressed as follows:

$$S^{est} = \frac{1}{MN} \sum_{m,n} \left| \sum_{l,k} a_{l-m,k-n} RS^{est}_{l-m,k-n} \right|^2$$

in which $S^{est}$ represents a received signal power estimate, $RS^{est}$ represents a channel response estimate based on a received reference symbol, a is a coefficient that depends on the at least one channel characteristic, l and k are time and frequency indices; and m and n are indices of time and frequency positions of received reference symbols RS at totals of M and N time and frequency positions.

21. The non-transitory medium of claim 17, wherein the second measuring method is based on estimated characteristics of a communication channel between the mobile receiver and the second base station; and the first measuring method includes coherent averaging of a number M of received reference symbols followed by non-coherent averaging of N coherent averages.

22. The non-transitory medium of claim 17, wherein the method of selecting further comprises tracking changes in at least one of the measurement interval and the timing of the at least one second base station.

* * * * *